United States Patent [19]

Weinstein

[11] Patent Number: 4,822,282
[45] Date of Patent: Apr. 18, 1989

[54] ASSEMBLY TO DEMONSTRATE AND TEACH THE GAME OF BRIDGE

[75] Inventor: Leonard Weinstein, Montreal, Canada

[73] Assignee: IKN Communications Inc., Montreal, Canada

[21] Appl. No.: 905,137

[22] Filed: Sep. 9, 1986

[51] Int. Cl.[4] ............................................. G09B 19/22
[52] U.S. Cl. ................................................... 434/129
[58] Field of Search ................ 434/128, 129; 273/155, 273/284

[56] References Cited

U.S. PATENT DOCUMENTS

| | | | |
|---|---|---|---|
| 1,961,014 | 5/1934 | Skolnik | 434/129 |
| 1,988,587 | 1/1935 | Ellsworth | 434/129 |
| 2,048,954 | 7/1936 | Shokler | 434/129 |
| 2,199,497 | 5/1940 | Jondreau | 434/129 |
| 2,226,973 | 12/1940 | Grigsby | 434/129 |
| 2,486,891 | 11/1949 | Stroh | 434/129 |
| 2,825,567 | 3/1958 | Simons | 273/294 |
| 3,070,903 | 1/1963 | Weedfald | 434/129 |
| 3,233,340 | 2/1966 | Brown | 434/129 |
| 3,731,399 | 5/1973 | Gordy et al. | 434/129 |
| 3,863,362 | 2/1975 | Borianne | 434/129 |
| 3,892,411 | 7/1975 | High | 273/155 |
| 3,899,837 | 8/1975 | Harnett | 434/129 |
| 3,913,921 | 10/1975 | Bourassa | 273/269 |
| 3,939,577 | 2/1976 | Amano | 434/129 |
| 3,995,862 | 12/1976 | Bertin | 273/241 |
| 4,190,253 | 2/1980 | Andrae | 434/129 |

FOREIGN PATENT DOCUMENTS

| | | | |
|---|---|---|---|
| 467995 | 9/1950 | Canada | 434/127 |
| 348685 | 5/1931 | United Kingdom | 434/129 |
| 606380 | 8/1948 | United Kingdom | 434/129 |

Primary Examiner—John E. Murtagh
Assistant Examiner—Andrew Joseph Rudy
Attorney, Agent, or Firm—Oblon, Fisher, Spivak, McClelland & Maier

[57] ABSTRACT

The assembly is intended to sequentially reveal four hands of bridge starting from the dealer's hand to and including the right side opponent's hand. As revealed, the hands are represented on an image reproducing surface such as an overhead projector. To arrive at this, there is provided a transparent sheet displaying four pre-determined bridge hands and a series of overlying transparent sheets successively concealing one to four hands of bridge. This assembly visually illustrates in an inter-active learning situation, and in an uninterrupted way, the appropriate bidding sequence and the play of each of the four hands of contract bridge, that is fifty-two cards.

21 Claims, 5 Drawing Sheets

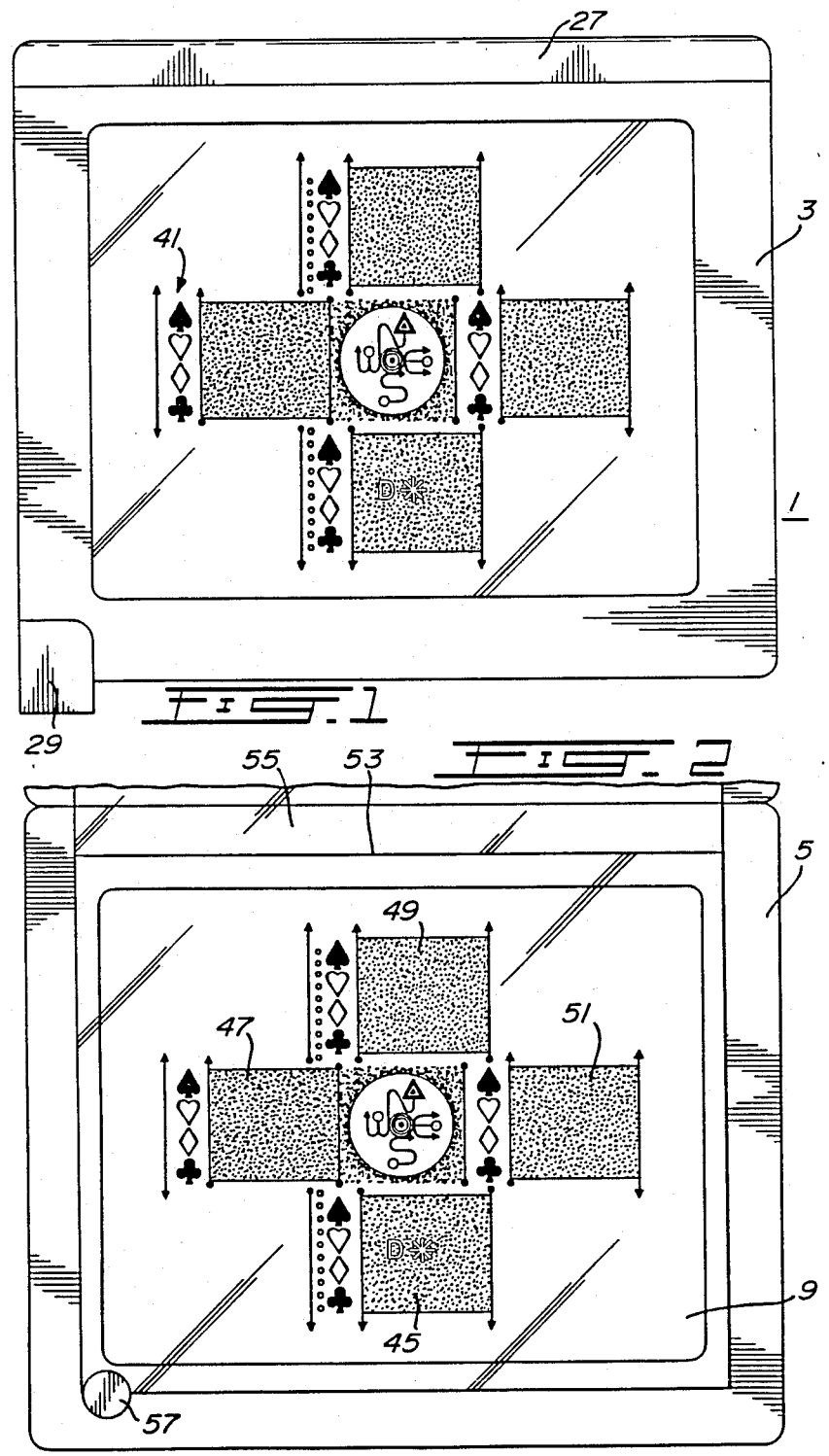

ASSEMBLY TO DEMONSTRATE AND TEACH THE GAME OF BRIDGE

BACKGROUND OF THE INVENTION (a) Field of the Invention

The invention relates to an assembly for teaching the game of contract bridge. More particularly, the present invention relates to a teaching aid designed to help people learn the game of contract bridge by sequentially revealing the four hands of bridge from the dealer's hand to and including the right side opponent's hand and representing them on an image reproducing surface, such as by means of an overhead projector and a free standing floor or wall screen.

(b) Description of the Prior Art

The standard method of teaching the game of bridge is to reproduce hands of bridge either on a black board or a table and discuss the bidding sequence that should normally take place. This method may also be used to illustrate the play of the cards and to teach the various conventions that are available to facilitate the game of contract bridge.

The disadvantage of such a system is that there is no permanent reproduction of the bidding sequence as it normally takes place, i.e. as each hand is sequentially revealed. In addition, discussion of the play as it could or should take place is somewhat awkward with the above methods. Also, the number of students who can actively participate is very limited.

U.S. Pat. No. 3,233,340 discloses a teaching and game machine that can be adapted to the game of contract bridge. However, the machine is strictly a mechanical contraption which does not easily lend itself to teach a group of students. Other references of interest in connection with the teaching of the game of bridge include the following patents:

| | |
| --- | --- |
| Canada | 467,995 |
| Great Britain | 348,685 |
| United States | 1,961,014 |
| | 2,199,497 |
| | 3,863,362 |
| | 4,190,253 |

To my knowledge, there is no device to enable a teacher to follow the normal bidding sequence and play of the game associated with a discussion with students which is adaptable to an infinite number of predetermined hands of bridge.

SUMMARY OF THE INVENTION

It is an object of the present invention to provide a system which visually illustrates the bidding sequence and the play of four pre-determined hands of contract bridge.

It is another object of the present invention to help people learn the game of contract bridge.

It is another object of the present invention to visually illustrate in an inter-active learning situation, and in an uninterrupted way, the appropriate bidding sequence and the play of the hand, including declarer play and defense, of fifty-two cards distributed thirteen each to four players.

It is another object of the present invention to provide a system and an assembly which enable a group of people learning contract bridge with a teacher, to bid and play the four hands displayed before them in the most correct manner.

It is another object of the present invention to provide a system wherein the distribution of the cards is not at random but pre-determined to illustrate the most appropriate bidding and card play, declarer play and defense, and to identify the underlying principles on which each bid and each play is based.

It is another object of the present invention to provide an assembly for teaching the game of bridge by sequentially revealing four hands of bridge from dealer's hand to and including right side opponent's hand, and representing the sequentially revealed hands on an image reproducing surface, thereby making possible the discussion and analysis of bidding for each hand until the contract is reached, the assembly comprising a sheet displaying four pre-determined bridge hands, including dealer's hand, left side opponent's hand, dealer's partner's hand and right side opponent's hand, the hands being arranged in the above-mentioned sequence, means overlying the sheet to individually conceal the four bridge hands, means associated with the overlying means for sequentially revealing the four bridge hands from the dealer's hand to and including the right side opponent's hand, and means for representing the sequentially revealed hands on an image reproducing surface.

Other objects and advantages of the invention will be apparent from the description which follows.

BRIEF DESCRIPTION OF THE DRAWINGS

FIG. 1 is a top plan view of an assembly according to the invention;

FIG. 2 is a top plan view of the assembly of FIG. 1, the cover being turned over and only partly illustrated;

DESCRIPTION OF PREFERRED EMBODIMENTS

Figure 7:
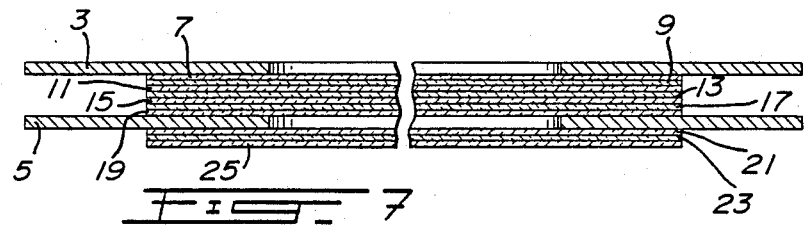
FIG. 7 is a cross-section view through an assembly according to the invention.
Figure 8:
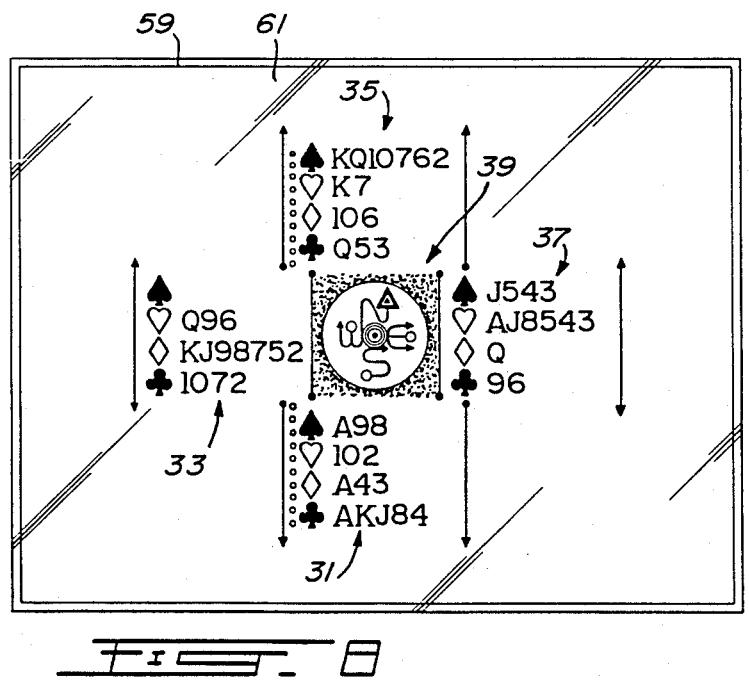
FIG. 8 shows a paper copy of the four bridge hands along with a clear acetate to be distributed to students before a lecture.

Referring to the drawings, more particularly FIG. 7, it will be seen that the assembly 1 according to the invention broadly consists of two rectangular frames 3 and 5 and ten sheets of transparent acetate, referred to by reference numerals 7, 9, 11, 13, 15, 17, 19, 21, 23 and 25. The two frames 3 and 5 are hinged together by means of an edge connector 27 (FIG. 1). In addition, there is a tab 29 which permits to turn over the rectangular frame 3. As shown, the tab is preferably mounted at the lower left corner of the top frame 3.

The rectangular frame 3 has fixedly mounted thereon, by any means known to those skilled in the art, a sheet of clear transparent acetate 7 (FIG. 7). This clear sheet is merely intended to constitute the frontispiece and to protect assembly 1.

The second rectangular frame 5, has fixedly mounted thereunder, also by any means known to those skilled in the art a sheet 21 displaying the black portions of four hands of bridge, a sheet 23 displaying the red portion of four hands of bridge and a clear transparent sheet 25 underlying sheets 21 and 23 to protect the latter all as shown in FIG. 7. The card identifications and other representations appearing on sheets 21 and 23 will be discussed latter. For the time being it will be sufficient to mention that it has been decided to choose two sheets each representing a different color (red or black) to simplify the printing process. In actuality, the two sheets 21 and 23, when superposed will give the impression of constituting one single sheet.

As mentioned above, the combination of sheets 21 and 23 includes an illustration of four hands of bridge, arranged crosswise according to cardinal points south, west, north and east. The four hands are referred to by reference numerals 31, 33, 35 and 37, and it will be understood that they will vary nearly ad infinitum as any randomly distributed hands of bridge. However, for teaching purposes, the hands will be pre-determined having in mind various bridge problems to be discussed.

Figure 3:
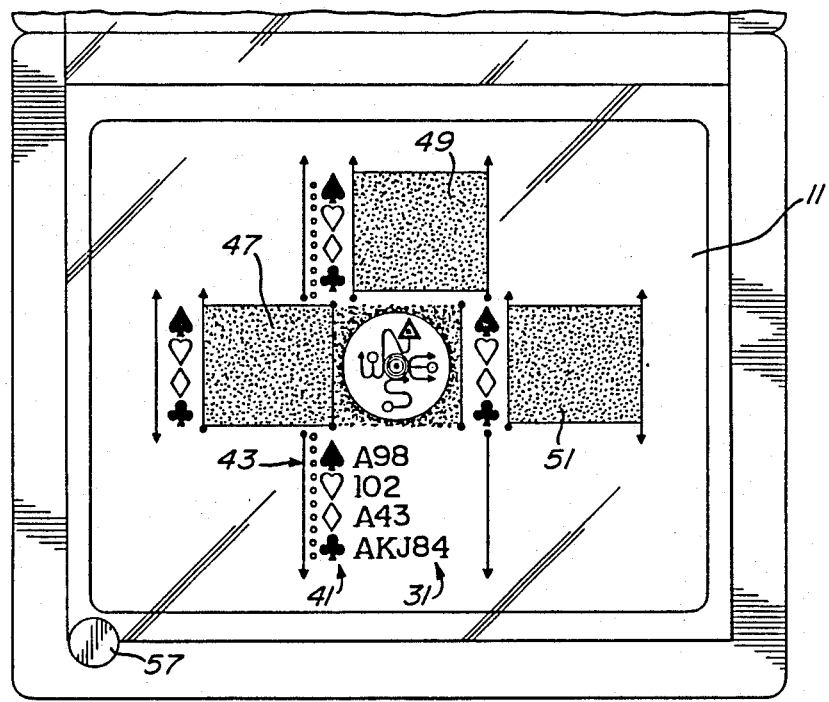
FIG. 3 is another top plan view revealing dealer's hand.
Figure 4:
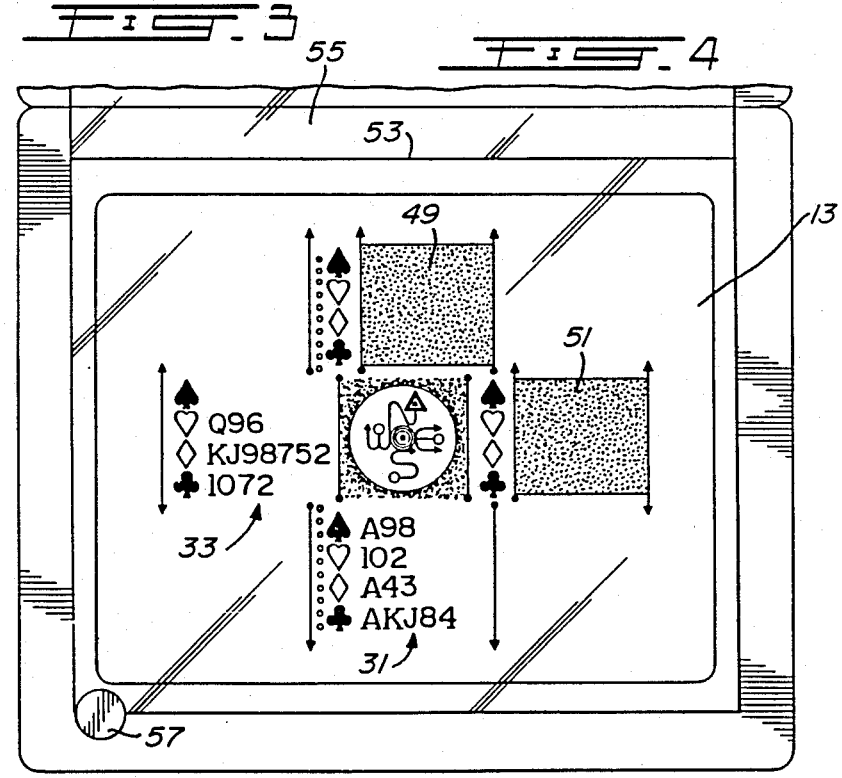
FIG. 4 is another top plan view additionally revealing left side opponent's hand.
Figure 5:
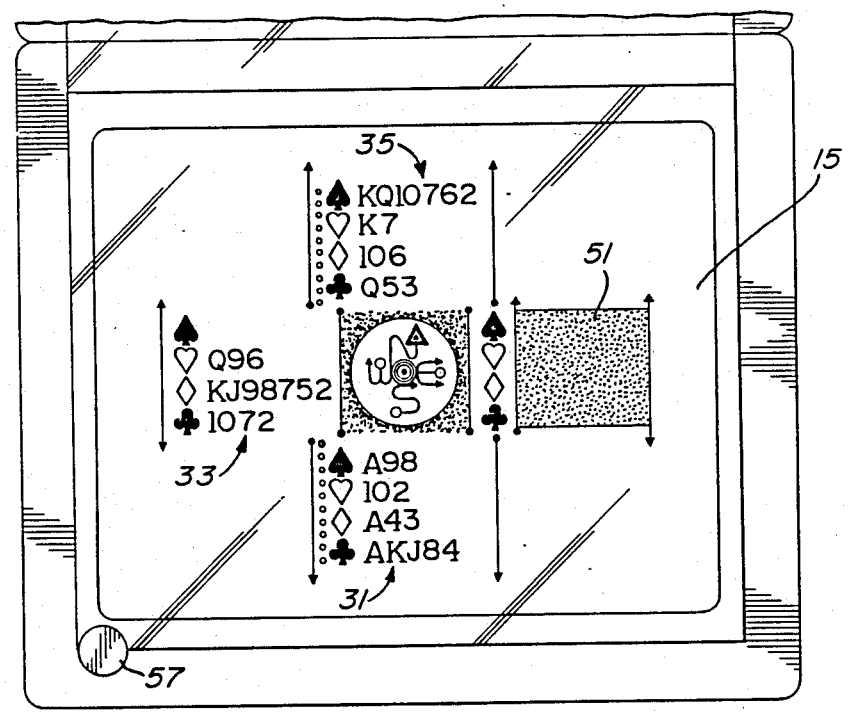
FIG. 5 is another top plan view additionally revealing dealer's partner's hand.
Figure 6:
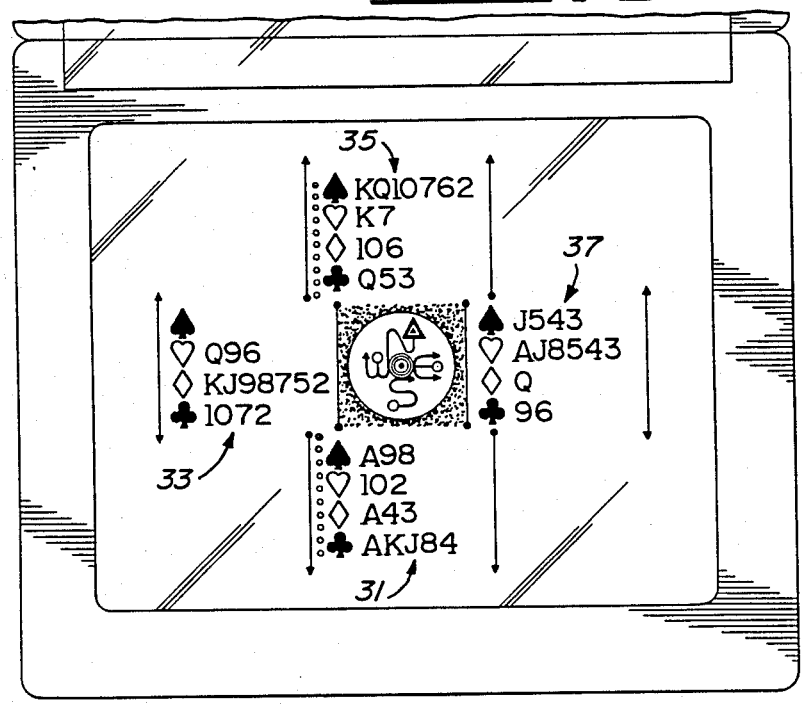
FIG. 6 is another top plan view revealing all four hands.

At the center of the four hands 31, 33, 35 and 37 (FIG. 6) which appear in combined sheets 21 and 23 there is a graphic indication 39 showing the four cardinal points. As this graphic indication will be illustrated in both black and red, the black part will be printed on sheet 21 and the red part will be printed on sheet 23 although this does not appear clearly in FIG. 6 because sheets 21 and 23 are transparent. This indication, as shown in FIG. 6, is a crosswise arrangement of the letters S, W, N and E. However any other arrangement is permissible within the scope of the present invention. More specifically, again as illustrated in the drawings, each display of a hand consists of a vertical column 41 (FIG. 3) representing spade, heart, diamond and club. The card identifications are arranged as horizontal rows opposite each spade, heart, diamond and club. Although this is not absolutely necessary, in the embodiment illustrated the representations for spade and club and the corresponding card identifications are printed in black on sheet 21 and the representations for heart and diamond and the corresponding card identifications are printed in red on sheet 23.

With some hands, it may be desirable to represent vulnerability and this has been done by means of a dotted line 43 printed in red (although this is not shown in the present drawings) opposite each vertical column.

Sheet 9 (FIG. 7) consisting of a transparent acetate displays four graphic elements 45, 47, 49 and 51 (FIG. 2) each disposed over corresponding hands 31, 33, 35 and 37 to conceal the latter. In addition, graphic element 45 overlying the dealer's hand 31, carries the letter D and an asterisk to designate the dealer.

Transparent acetate 11 (FIG. 7) is disposed underneath sheet 9 and reveals dealer's hand 31. For this purpose, it displays only the three graphic elements 47, 49 and 51 disposed over the three remaining hands.

Transparent acetate 13 (FIG. 7) is disposed underneath sheet 11 and reveals dealer's hand and left side opponent's hand. For this purpose, it displays only two graphic elements 49 and 51 disposed over hands 35 and 37.

Transparent acetate 15 (FIG. 7) is disposed underneath sheet 13 and reveals additionally dealer's partner's hand. For this purpose, it displays only graphic element 51 disposed over hand 37.

It will be noted that the sheets 9, 11, 13 and 15 are hinged together at 53 (FIG. 2) by rotatably fixing one edge of each sheets 9, 11, 13 and 15 along one side 55 of the frame 5.

Finally, also hinged at 53, there are two additional clear transparent acetates 17 and 19 to be used by the teacher in association with a color marker (not illustrated).

Each sheet 9, 11, 13, 15, 17 and 19 has a tab 57 at the lower left corner to facilitate turning over of the sheets, by pivoting along hinge 53 to then reveal the next underlying sheet.

The assembly which has just been described is preferably associated with a paper copy 59 of the four pre-determined bridge hands and a transparent sheet 61 to cover the paper copy 59, thereby enabling the student to mark the student's transparent sheet 61 with an erasable color marker following explanations given by a teacher of the game of bridge using the assembly just described.

Figure 9:
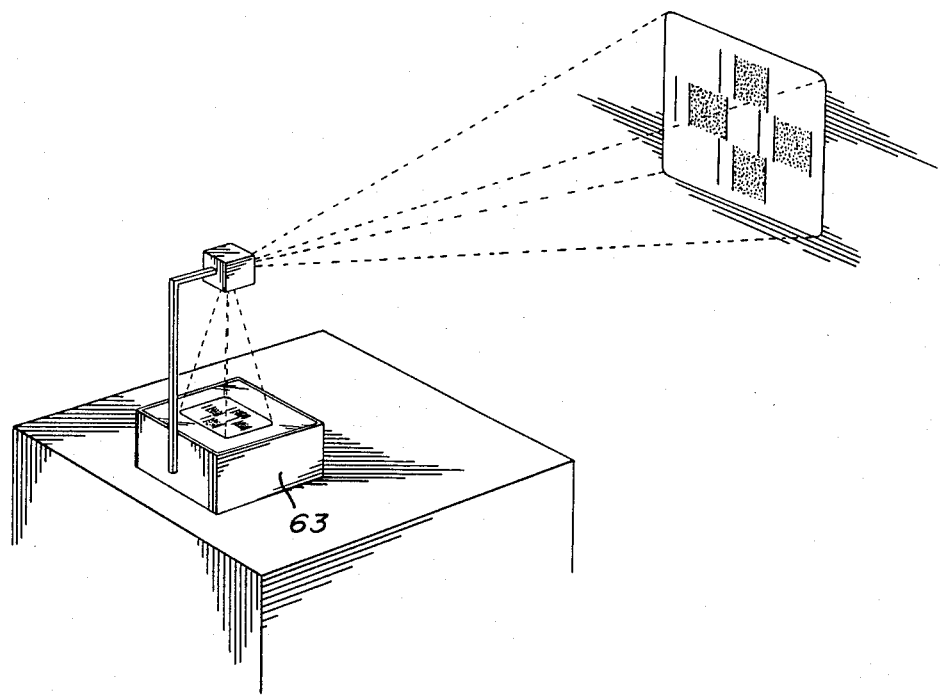
FIG. 9 is a sketch showing the hands of a game of bridge being reproduced on an image reproducing surface, using an overhead projector.

The assembly can be used with an overhead projector 63 as shown in FIG. 9. However, it is within the scope of the present invention to use the assembly with any displaying device on an appropriate surface, a free standing screen or a wall screen. A slide projector could also be used or the invention can be adapted to be used with a film strip projector. The display may also be produced electronically on a TV screen.

It is merely sufficient to turn over the various sheets to sequentially reveal the various hands.

I claim:

1. An assembly for teaching a game of bridge by sequentially revealing four hands of bridge from a dealer's hand to and including right side opponent's hand and representing the sequentially revealed hands on an image reproducing surface, thereby enabling learners or students to discuss and analyze bidding with a bridge teacher and suggest a play for each hand until suggestions made indicate how to reach a contract, said assembly comprising a sheet capable of being represented on said image reproducing surface, said sheet displaying four pre-determined bridge hands, including a dealer's hand, left side opponent's hand, dealer's parter's hand and right side opponent's hand, said hands being arranged in a cross wise manner in the above-mentioned sequence, means overlying said sheet to individually conceal said four bridge hands, means associated with said overlying means for revealing, on said image reproducing surface, said four bridge hands including said dealer's hand to said right side opponent's hands, one full hand being revealed at a time, and means enabling the teacher to sequentially reveal hands on said image reproducing surface.

2. The assembly as defined in claim 1, wherein said sheet is transparent.

3. The assembly as defined in claim 2, wherein said transparent sheet contains a representation of the four hands arranged crosswise according to cardinal points south, west, north and east, and means defining said four cardinal points.

4. The assembly as defined in claim 3, wherein said means defining said four cardinal points are provided at the center of said representation.

5. The assembly as defined in claim 4, which comprises means associated with two opposite hands to represent vulnerability of one side.

6. The assembly as defined in claim 5, wherein said means defining said four cardinal points comprise a crosswise arrangement of the letters S, W, N and E.

7. The assembly as defined in claim 6, wherein each display of a hand consists of a vertical column representing spade, heart, diamond and club and cards identifications arranged as horizontal rows opposite each said spade, heart, diamond and club.

8. The assembly as defined in claim 7, wherein representations for spade and club and corresponding card identifications are printed in black, and representations for heart and diamond and corresponding card identifications are printed in red on said sheet.

9. The assembly as defined in claim 8, wherein the vulnerability representation is given by means of a vertical dotted line printed opposite said vertical column.

10. The assembly as defined in claim 9, wherein said sheet consists of two superimposed plies, one said ply having black printing and said other ply having red printing.

11. The assembly as defined in claim 10, wherein said sheet comprises one additional ply, said additional ply being essentially transparent and being disposed underneath said two superposed plies, to protect the bottom ply.

12. The assembly as defined in claim 11, wherein said sheet is made of a transparent acetate material.

13. The assembly as defined in claim 2, wherein said means to conceal said four bridge hands comprise a second transparent sheet displaying four graphic elements, each disposed over a corresponding hand to conceal the latter.

14. The assembly as defined in claim 13, which comprises hinge means, said transparent sheet displaying four bridge hands and said second transparent sheet being associated with said hinge means to enable to turn over one sheet relative to the other.

15. The assembly as defined in claim 14, wherein said sheet displaying said four hands is mounted in a first rectangular frame, said hinge means being defined by rotatably fixing one edge of said second transparent sheet along one side of said frame.

16. The assembly as defined in claim 15, wherein the graphic elements overlying the dealer's hand carry an identification designing the dealer.

17. The assembly as defined in claim 16, wherein said identification comprises the letter D.

18. The assembly as defined in claim 17, wherein said means for sequentially revealing said four bridge hands comprise a third transparent sheet disposed underneath said second sheet, said third sheet revealing dealer's hand, and displaying three graphic elements each disposed over the three remaining bridge hands, a fourth transparent sheet disposed underneath said third sheet, said fourth sheet revealing dealer's hand and left side opponent's hand, and displaying two graphic elements each disposed over the two remaining bridge hands, a fifth transparent sheet disposed underneath said fourth sheet, said fifth sheet revealing dealer's hand, left side opponent's hand and dealer's partner's hand, and displaying one graphic element disposed over the remaining bridge hand, said third to fifth transparent sheet being similarly associated with said hinge means as said second transparent sheet.

19. The assembly as defined in claim 18, which comprises at least one clear transparent sheet between said sheet displaying the four bridge hands and the fifth transparent sheet, said at least one clear transparent sheet being similarly associated with said hinge means as said second to fifth transparent sheets.

20. The assembly as defined in claim 20, which comprises a clear transparent sheet mounted in a second rectangular frame to cover said second sheet, said second rectangular frame being hinged on said first rectangular frame, said clear transparent sheet mounted in said second rectangular frame to protect said assembly.

21. An assembly as defined in claim 20, which comprises tabs mounted on each said second to fifth transparent sheet and said at least one clear transparent sheet to facilitate turning over of said sheets.

* * * * *

UNITED STATES PATENT AND TRADEMARK OFFICE
CERTIFICATE OF CORRECTION

PATENT NO. : 4,822,282

DATED : April 18, 1989

INVENTOR(S) : LEONARD WEINSTEIN ET AL

It is certified that error appears in the above-identified patent and that said Letters Patent is hereby corrected as shown below:

| Col. | Line | |
|---|---|---|
| 3 | 9 | Change "identifications" to --identification--, |
| 3 | 11 | Change "latter" to --later--. |

Signed and Sealed this

Third Day of July, 1990

Attest:

HARRY F. MANBECK, JR.

*Attesting Officer*  *Commissioner of Patents and Trademarks*